July 7, 1964

A. L. COURTNEY 3,140,058

MACHINE FOR FORMING LAMINATIONS

Filed June 23, 1960

INVENTOR.
ALBERT L. COURTNEY.
BY

*Richard G. Geib*

ATTORNEY.

July 7, 1964

A. L. COURTNEY 3,140,058

MACHINE FOR FORMING LAMINATIONS

Filed June 23, 1960

INVENTOR.
ALBERT L. COURTNEY
BY
John A. Young
ATTORNEY

July 7, 1964    A. L. COURTNEY    3,140,058
MACHINE FOR FORMING LAMINATIONS
Filed June 23, 1960    6 Sheets—Sheet 4

INVENTOR.
ALBERT L. COURTNEY
BY John A. Young
ATTORNEY

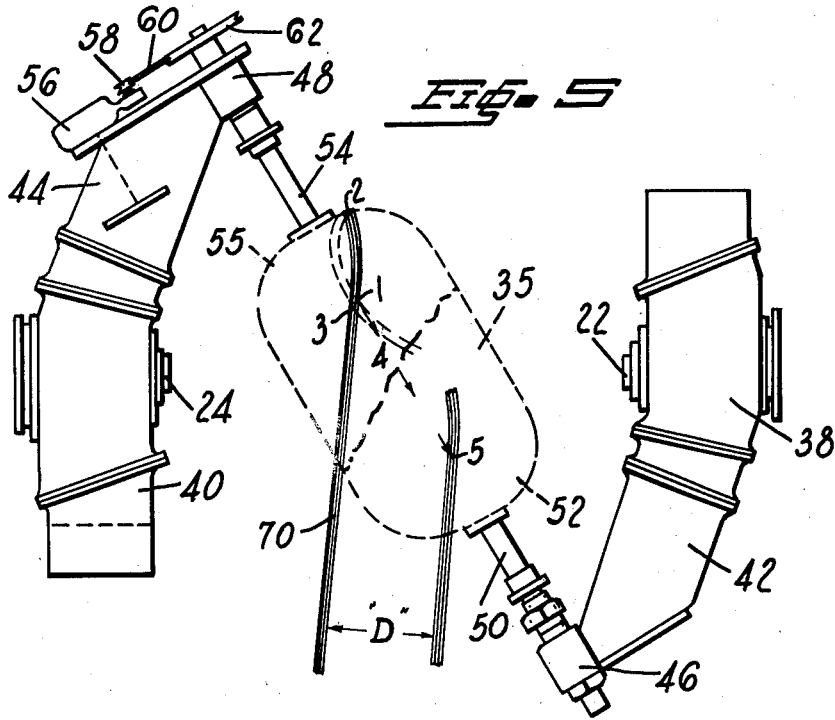
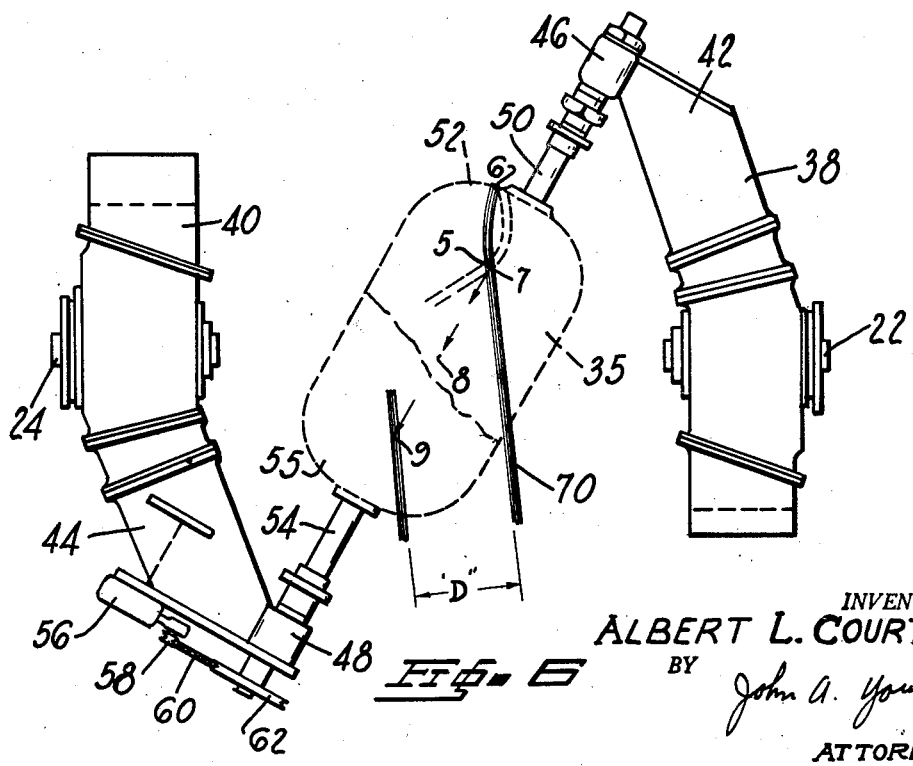

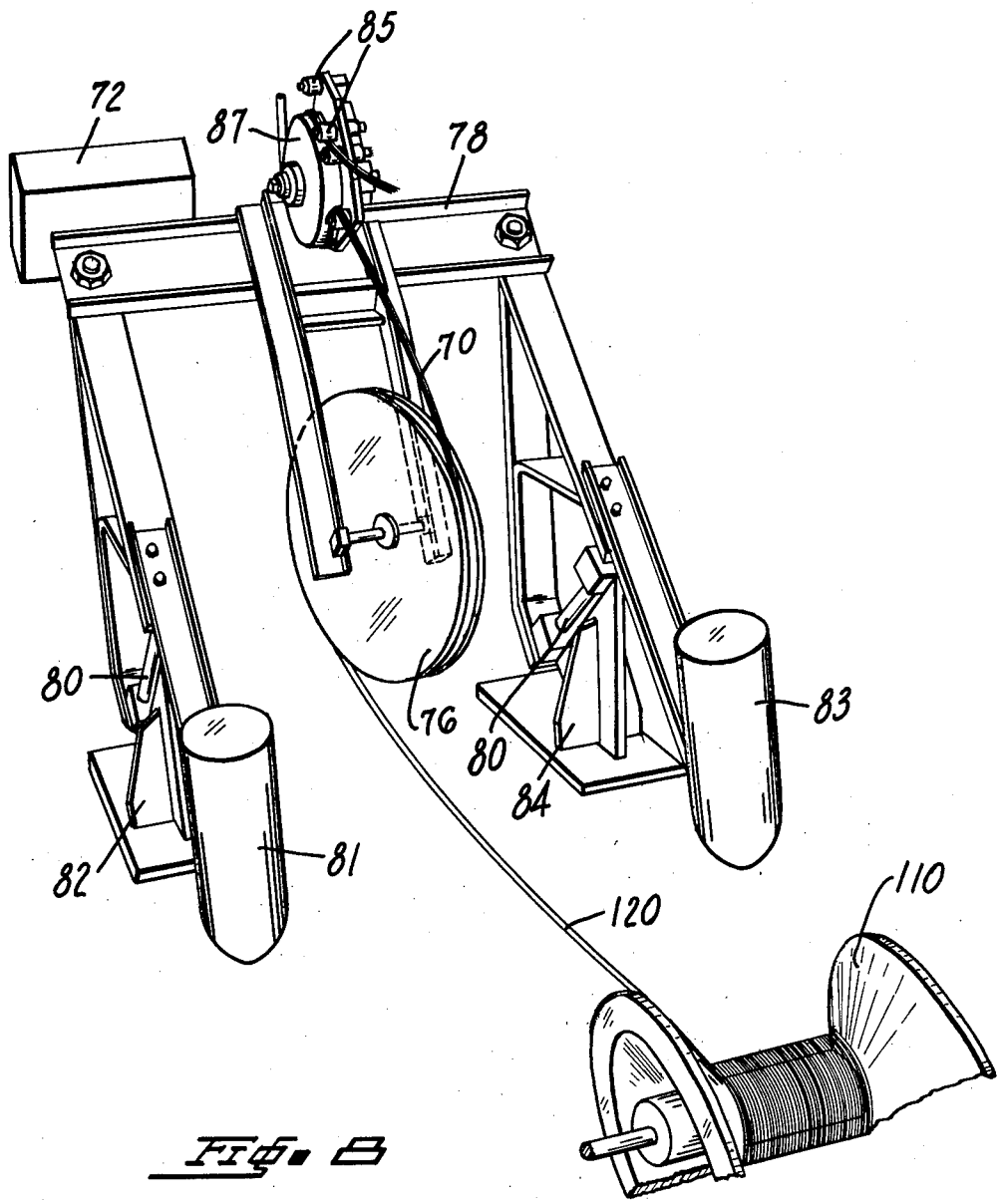

United States Patent Office 3,140,058
Patented July 7, 1964

3,140,058
MACHINE FOR FORMING LAMINATIONS
Albert L. Courtney, South Bend, Ind., assignor to The Bendix Corporation, South Bend, Ind., a corporation of Delaware
Filed June 23, 1960, Ser. No. 38,218
7 Claims. (Cl. 242—2)

This invention relates to a machine for producing laminations by winding continuous lengths of tape or the like over a mandrel.

One of the objects of the present invention is to provide a machine which will effect a combination of rotational and end-over-end movement of the mandrel as tape is being fed in continuous lengths so that the tape will follow a continuous helical path over the length and ends of the mandrel until a complete casing lamination is formed.

Another object of the invention is to provide a coordinated rotational and end-over-end turning of the mandrel so that the tape can be laid at a prescribed course while the lamination is being generated by the tape.

A further object of the invention is to provide a machine in which the attitude of the mandrel can be adjusted so that during its coincident rotational and end-over-end turning movement the prescribed path for the tape can be followed to achieve an optimum strength for the casing.

Another object for the invention is to provide a machine which lends itself to automatic operation wherein dispensing of the tape under uniform tension is coordinated with the composite rotational and end-over-end movement of the mandrel so that tape winding can be continued without interruption during the formation of the casing and according to the prescribed winding path for the tape as it is laid continuously along its helical path.

Other objects and features of the invention will become apparent from a consideration of the following description, which proceeds with reference to the accompanying drawings; wherein FIGURE 1 is a perspective view of the machine while it is in operation, with the mandrel being partially covered by tape, the casing being as yet incomplete;

FIGURE 5 illustrates the mandrel in horizontal position and shows the tape following a winding cycle, the sequence being numbered in correspondence with FIGURE 4;

FIGURE 6 illustrates the mandrel turned end for end 180° and further continuing the winding cycle the sequence being numbered and proceeding from FIGURE 5;

FIGURE 8 is an isometric detail view of the tape dispensing mechanism from which tape is fed onto the mandrel under substantially constant tension.

The present invention is intended for use in forming laminations for pressure vessels, and is especially useful for practicing the winding processes illustrated in copending U.S. application No. 17,909, filed March 28, 1960, to which reference is made for the details of the winding process and method of determining the proper path for the tape as it is wound in cycles around the mandrel so that the cumulation of cycles will produce a winding "generation" wherein the cylindrical part of the casing is uniformly covered with cross lying tapes at conjugate angles providing a casing structure of uniform strength.

Figure 7:
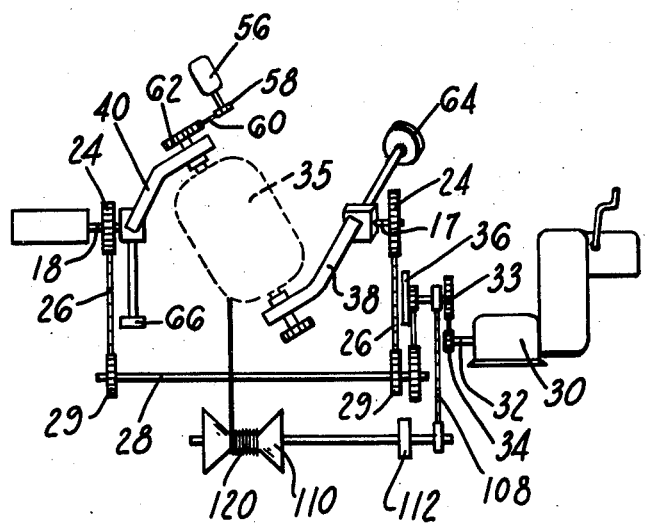
FIGURE 7 is a schematic view of the winding machine drive mechanism.

Referring now to the machine designated generally by reference numeral 10, there is provided a base 12 having two spaced stanchions 14 and 16. Each stanchion is provided with rotatable shafts 17 and 18 which are supported on bearings 20 and 22 at their opposite ends, said bearings being carried by the stanchions 14 and 16. A sprocket wheel 24 is splined to each shaft 17, 18 and a chain drive 26 operated by a drive shaft 28 (FIGURE 7) extends between the two spocket wheels 24 and sprocket wheels 29 so that shafts 17 and 18 are driven synchronously through the drive shaft 28. An electric drive motor 30 has a power take-off shaft 32 which is supported on stanchion 14 and is connected with the motor 30 through an idler 33 and gear reduction 34. The gear reduction 34 includes a brake 36; one which has proved satisfactory for my purposes is an Eaton "Dyna-Torq" electric brake Model 31J having 700 ft./lbs. torque. This is only illustrative of a suitable braking means and is in no sense limitative. The motor is a U.S. Varidrive motor Type VEVGD having an output of 28/84 r.p.m. Again, this is only illustrative of one useful motor means. The motor described is manufactured by U.S. Electric Motor Company. In all, between the motor 30 and the working shafts 17 and 18, there are three speed reductions—one through idler 33, a second through gear reduction 34, and the third through chain 26. The specific reduction is a matter of design taking into account the weight of the structure being turned by the motor, its rate of rotation, and the capacity of the motor 30. Since the structure rotated by the motor 30 is quite heavy, typically in the order of three and one-half to four tons, the gear reduction is in the order of 125/1 such that a motor of 3 H.P. will produce end-over-end rotation of the mandrel 35 in the order of 1–6 r.p.m.

Figure 1:
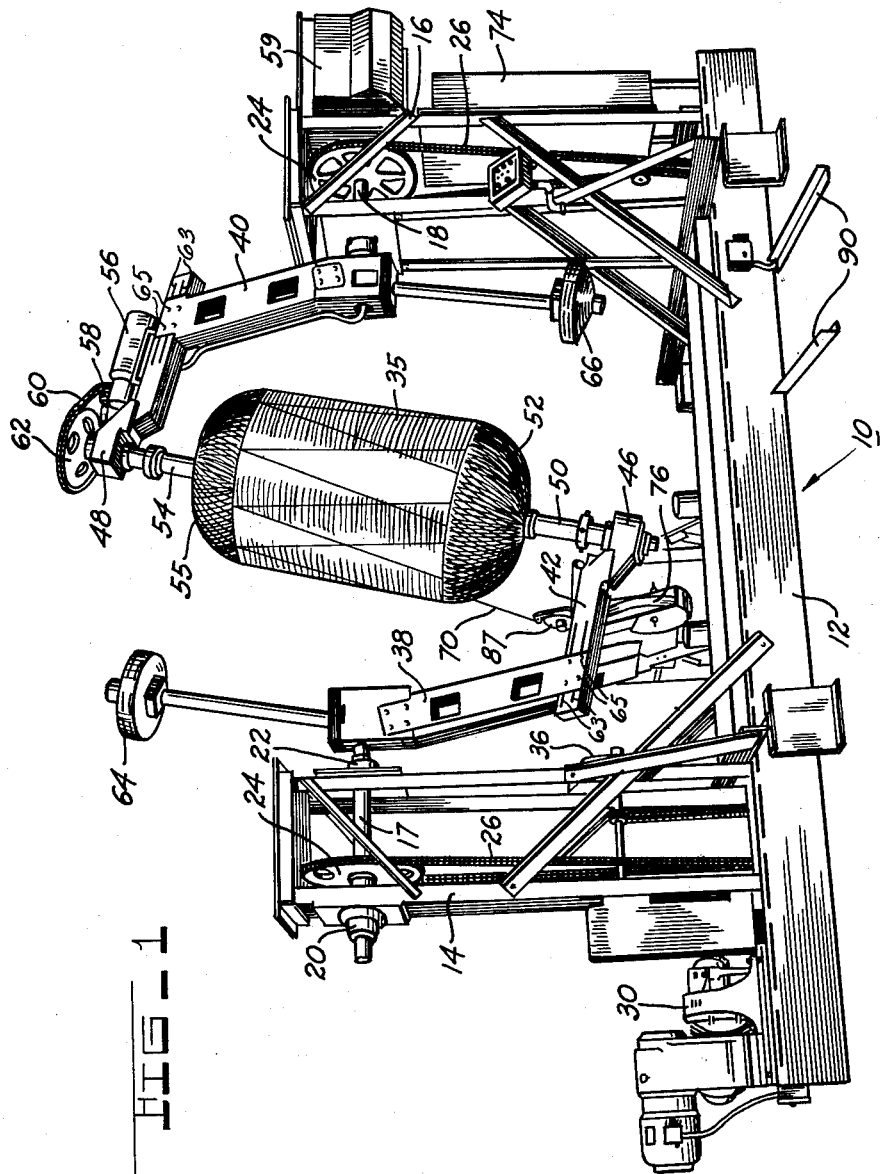

Two arcuate winding arms 38 and 40 are fastened 180° apart to a respective one of said working shafts 17 and 18, each arm 38 and 40 having a cross piece 42, 44 providing load supporting ends 46, 48. A spindle 50 is located between the end 46 and end dome 52 of mandrel 35 and a complementary spindle 54 extends between load supporting end 48 and the opposite end dome 55 of the mandrel 35 so that the mandrel can rotate on an axis defined by an imaginary line connecting the load support ends 46 and 48 of the winding arms 38 and 40 and also tumble end-over-end about an axis passing between shafts 17 and 18. A one-half horsepower motor 56, supported on winding arm 40 for rotation with the arm 40, includes a power take-off sprocket 58, chain drive 60 and sprocket wheel 62, to effect rotation of spindle 54, thereby rotating the mandrel 35 on its axis of rotation. The motor 56 is powered by current delivered through a conductor cable 57 from a slip ring box 59 mounted on stanchion 16. The cross pieces 42, 44 may be moved or adjusted relatively to the arms 38, 40 to change the attitude of the mandrel 35 in order to vary the wrapping angle as desired. As shown in FIGURE 1, the cross pieces 42 and 44 may be provided with slots 63 through which fastening bolts 65 carried by winding arms 38 and 40 extend. The bolts 65 are threadedly engaged with associated nuts, not shown, which are loosened to permit the cross pieces 42 and 44 to be moved in the direction of the slots 63 and which are tightened to lock the cross pieces 42 and 44 in position relative to winding arms 38 and 40, respectively. The angular deviation between spindle 50 and load supporting end 46 and between spindle 54 and load supporting end 48 resulting from adjustments of cross pieces 42 and 44 may be compensated for by providing self-aligning bearings, not shown, in the load supporting ends 46 and 48 which rotatably support said spindles or by providing each of the spindles 50 and 54 with a universal joint, not shown, at the supported end thereof. The self-aligning bearing arrangement or the universal joint arrangement is conventional and will be readily understood by those persons skilled in the art. Spindles 50, 54 for supporting the mandrel 35 are also changeable in accordance with the size of the mandrel depending upon the size of the casing to be constructed.

Because of the considerable weight of winding arms 38 and 40 and the mandrel 35 which is supported thereby, a substantial torsion load is imposed on the working shafts 17 and 18 so that at various angular positions of the arms 38 and 40 a twisting force is imposed on the working shafts 17 and 18 and affecting tumble rotation of the mandrel; to correct this, counterweights 64 and 66 are fastened to the winding arms 38 and 40 and project in a direction opposite the winding arms 38 and 40. Thus, unbalanced torsional stress on the working shafts 17 and 18 is relieved because weights 64, 66 counterbalance by the combined weight of the mandrel and winding arms 38, 40 in each angular position of the mandrel 35.

As the winding arms 38 and 40 are caused to turn by the working shafts 17 and 18, the mandrel 35 turns end-over-end and the motor 56 effecting rotation of the spindles 54 and 50 produces a rotation of the mandrel 35 on its longitudinal axis. These two separate movements accomplished by motors 30 and 56 respectively, supply the necessary movement of the mandrel 35 so that a length of tape 70 can be passed over the mandrel and it will describe a continuous helical type movement approximating a figure 8 about the outer surface of the mandrel, each of these approximate-figure-8 windings constituting a cycle and each cyle being related to a succeeding cycle so that at the end of a generation of cycles the casing is covered uniformly by cross lying tapes at conjugate angles. The problem of selecting the suitable wrapping angle, width of tape in relation to the size of the casing and the shape of the end domes is a matter which is fully explained in copending application No. 17,909. It will be understood, however, that in order to achieve the proper winding pattern it is necessary to coordinate the rotational speed of the mandrel effected by motor 56 and the end-over-end turning movement of the mandrel effected by motor 30, this being a matter of selection which is available to the operator by pressing the appropriate control button on the control box 72 which acts through a control center 74 for regulating motors 30 and 56.

Figure 2:
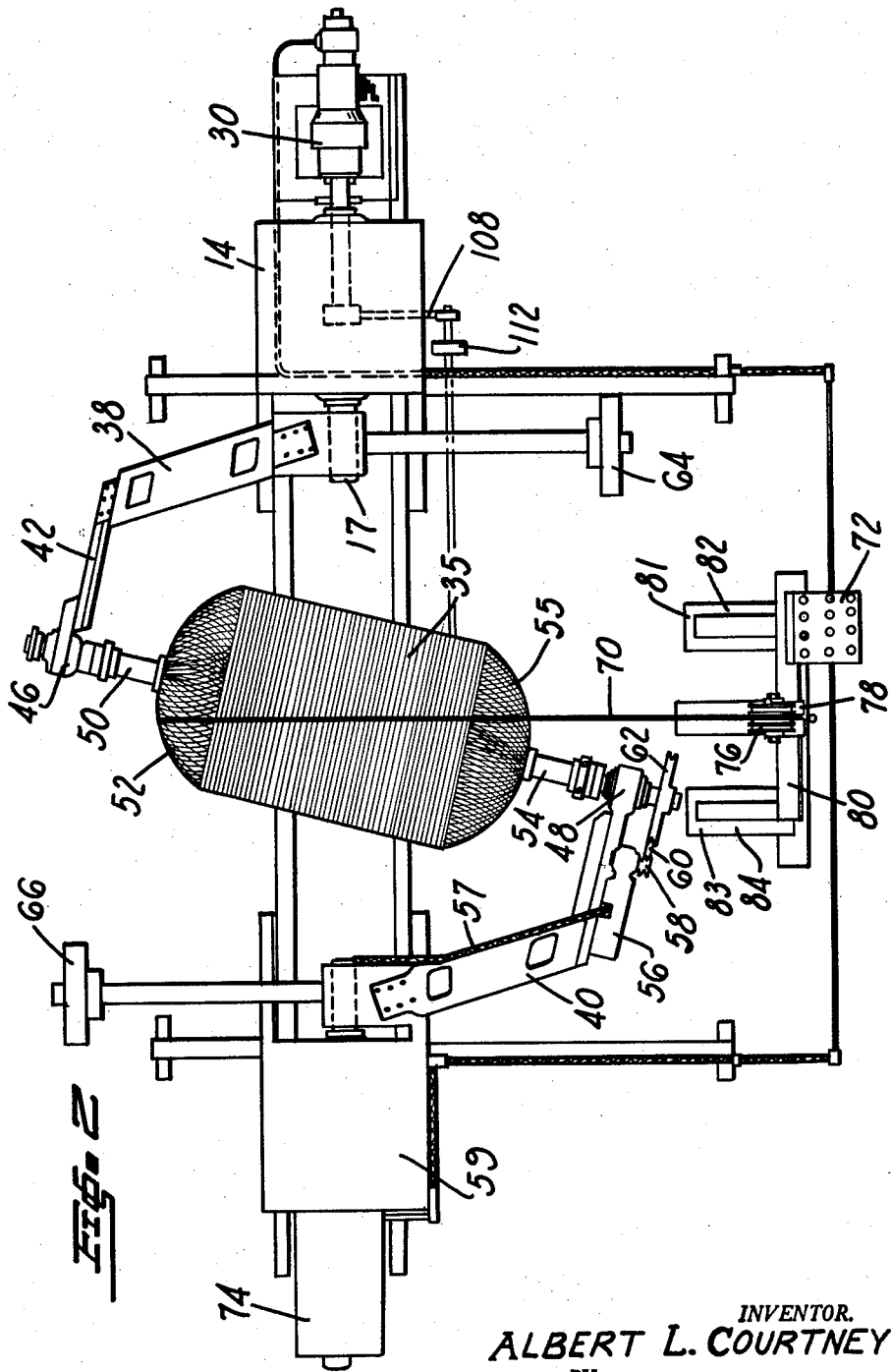
FIGURE 2 is a top view of the machine shown in FIGURE 1 with the mandrel shown in a horizontal position.
Figure 3:
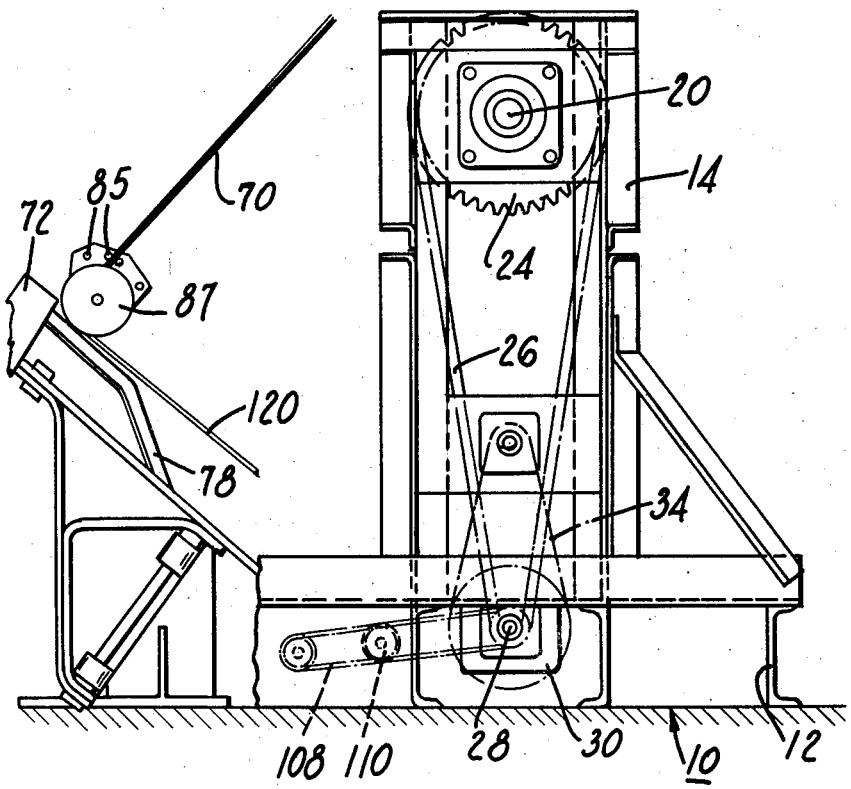
FIGURE 3 is an end view of the tape winding machine viewed from the right hand side of FIGURE 2.

The tape feeding means, shown in FIGURES 2 and 8, includes a reel 76 on which is wound a suitable length of tape in quantities of 3,000 feet, the typical width of the tape being ⅞". The reel 76 is mounted on a carriage 78, the carriage being swingable back and forth on pivot mounting shafts 80 which are supported on legs 82 and 84. The carriage is counterbalanced by weights 81 and 83 to reduce the effort required to swing the carriage back and forth and thus cause the feed off tape to traverse laterally.

The tape 70, as it is pulled off the reel 76, is passed over a series of feed rollers 85 and a drum having a slip clutch 87, the details of which are not a part of the present invention, to maintain a constant tensile load on the tape 70 of about 70 pounds. The constant tensile force insures a uniformly strengthened lamination and also causes the tape to lie flatly against the face of the mandrel. Another factor is that the uniform tension causes the tape to traverse a geodesic path over the end domes, i.e. a minimum length path. When the winding process is nonautomated, the mandrel 35 is marked around its periphery with numbers to mark out the proper winding path so that the operator knows which space to cover during a given wrapping cycle and, depending upon the angularity of the longitudinal axis of rotation of the mandrel with respect to the length of tape, the reel 76 is traversed back and forth by swinging the carriage 78 to cause the tape 70 to lay over the prescribed path set out by the numbering system. It is possible, of course, and it is within the teaching of the present invention to provide suitable controls for coordinating the rotational and end-over-end turning movement of the mandrel with a controlled reciprocable movement of the reel 76 so that the tape will automatically be fed over the prescribed path. Such control systems are available.

*Winding Operation*

Preliminary to any winding operation, calculations are made to determine the proper path of the tape over the mandrel 35 which corresponds to the interior dimension of the finished casing. The pattern is generally determined from the diameter of the casing, the shape of the end domes of the casing, the width of the tape and the strength and weight required for the finished casing. Taking a specific example, a casing of 53.85" inner diameter and 77.15" length having end domes of elliptical configuration is constructed with a ⅞" width tape constructed in accordance with that shown in copending application 825,958, filed July 9, 1959.

To provide a casing of 145# weight and capable of 430 p.s.i. strength, we follow a winding cycle with the tape lying at 12°46′20″ angle to the longitudinal axis of the mandrel and a shift of 15.126° between each winding cycle, there being 119 cycles for each generation and a total of 4 generations supplemented by 8 circumferential windings.

Figure 4:
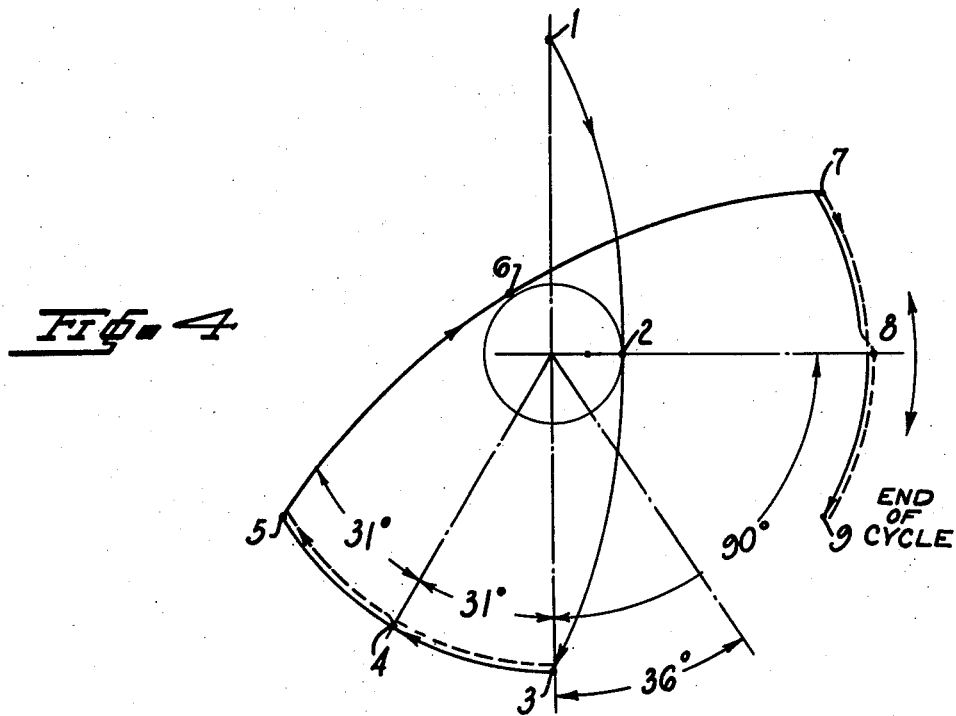
FIGURE 4 illustrates angular movement of the tape during a winding cycle, as viewed from the end of the mandrel.

Winding cycle is defined as the one complete passage of tape around the end dome helically along the length of the mandrel in one direction over the opposite end dome helically over the cylindrical part of the mandrel in an opposite direction and then starting anew. A generation is defined as the completion of an integral number of cycles which will cover the cylindrical part of the casing uniformly with cross lying tapes at conjugate angles. It is characteristic of the present invention that as the tape is passed over the end domes (which may consist of any smooth surface of revolution) the tape will follow a geodesic path, i.e., a minimum length path between the points of entry and exit from the end dome. Referring to FIGURES 4, 5, and 6, there is illustrated the angular movement of the tape as it passes helically on the cylindrical portions of the mandrel and geodesically on the end domes. For example, referring to FIGURE 4 the path of the tape as it passes over the end dome is produced by a combination of end-over-end movement of the mandrel on its horizontal axis and rotation of the mandrel on its longitudinal axis so that the tape, starting at point 1 traverses an angular amount traced by line 1–2–3, the length of tape in the distance 1–2–3 being passed over the end dome 55.

At point 3 (FIGURE 5) the tape begins to pass over the cylindrical portion of the mandrel and the tape follows a helical path in one direction through points 3–4–5. To achieve this helical winding, the winding arms 38 and 40 may cease rotation but the mandrel 35 will continue rotation on its longitudinal axis and the winding reel 76 moved through distance "D" so that the compound movement of the reel 76 through the distance "D" and the rotational movement of the mandrel on its longitudinal axis will cause the tape to travel along a helical path over the cylindrical portion of the casing through points 3—4—5 at which time the tape begins to enter the opposite end dome 52 of the casing. The total angular movement of the tape as it travels helically is indicated in FIGURE 4 and is approximately 62°. While the tape is being wound helically on the cylindrical section the winding arms 38 and 40 may continue to turn but such turning movement of the arms is nonfunctional in determining the path of the tape over the cylindrical section of the mandrel 35. The distance "D" which the winding head must travel is a function of the wrap angle θ (which is the angle that the tape makes in relation to the longitudinal axis of the mandrel) and the length of the mandrel; and the rate of movement of the winding reel through the distance "D" is a function of the rotational speed of the mandrel 35 on its longitudinal axis.

As the tape is passing over the opposite end dome 52 through path 5–6–7 (FIGURES 4 and 6), the direction of angular movement is reversed from the movement over the first end dome 55 and the winding arms are rotated 180° from the position shown in FIGURE 5 to that of FIGURE 6. The winding arms may then be held stationary or continue to turn but the mandrel 35 continues to turn rotatably on its longitudinal axis while the winding head moves leftwardly through the distance "D" which is the same as the distance "D" in FIGURE 5 but represents movement in an opposite direction. The compound movement of the winding head leftwardly and rotational movement of the mandrel causes the tape to travel over a helical path 7–8–9. As in the winding of the helix along path 3–4–5 any turning movement of the winding arms is nonfunctional in determining the path of the helical movement. When the tape reaches point 9 the winding cycle is complete and a second winding cycle is initiated; between each successive cycle, however, there is a shift of angularity so that the cycles do not repeat in their paths until an integral number of cycles has effected a complete generation which is defined by a uniform coverage of cross lying tapes at conjugate angles over the entire area of the cylindrical section of the mandrel.

If the operator should wish at any time to stop the winding cycle in the middle of the winding operation he merely deactuates the motors 30 and 56 through the control box 72 (FIGURE 8) and applies the brake 36 (FIGURE 7), the brake 36 being connected to the idler 33 and having a capacity to absorb the inertia of rotating arms 38, 40, mandrel 35 and counterbalance weights 64, 66.

When the helical winding pattern is completed, it is sometimes the practice to add circumferential windings because hoop stress is greater than longitudinal stress and where the wrap angle is other than 54°44′ the tape is better capable of resisting longitudinal stress than hoop stress. Therefore, the machine operation includes means for adding additional circumferential windings by swinging the winding arms 38 and 40 so that the longitudinal axis of rotation of the mandrel is parallel to the ground and a reel of tape mounted on a raised platform (not shown) is then wheeled onto tracks (not shown) and motor 56 actuated; the reel then traverses back and forth the length of the cylindrical section of the mandrel and feeds out tape so that a series of circumferential windings are generated as can be seen by the pattern of the windings in FIGURE 1 where circumferential windings have been applied.

Referring now to FIGURE 8, the reel 76 which is mounted on a trapezoidal linkage carriage 78 feeds off tape in a direction perpendicular to a vertical plane transverse to the tape. Thus, the tape as it moves through the distance "D" is subject to a constant tensile force and a twisting force is not imposed on the tape as it is laid along its helical path. Because the distance from the carriage to the mandrel varies, a tensioning device such as a friction clutch or the like 87 (details not being shown but well known to those skilled in the art) is included to constantly maintain approximately 70 pounds tensile force on the tape while it is being wound.

As the tape passes over the end dome a slight twisting force is imposed on the tape, which is insignificant except where the end dome configuration becomes quite large in which case, in order to avoid twisting of the tape, the winding reel or feed rollers 85 may be freely swivelled to feed the tape approximately perpendicularly to the curved surface of the end dome. Normally, however, it is not necessary to swivel the winding reel on the carriage but only to traverse it back and forth.

The machine described is useful for making any manner of casing constructions in accordance with the prescribed winding pattern. All that is necessary is that rotational speed of the mandrel be coordinated with the transverse movement of the reel 76 to effect the desired helical path, this being accomplished either by hand where the pattern is laid out on the mandrel and transverse movement of the reel 76 being effected by visually following the path of the tape in accordance with the numbering on the mandrel; or, this can be accomplished automatically by suitable scheduling cam arrangements. To provide the necessary winding over the end domes, the winding arms are rotated to effect end-over-end movement of the mandrel and the tape laid geodesically over the end domes. The arms can, as mentioned, be turned continuously or intermittently as the tape reaches the end domes.

The tape 70 may take numerous different forms and one suitable construction is set forth in application 825,958. The tape is typically a resin-bonded continuous filament metallic wire construction and is interwound on the reel 76 with "Mylar" plastic ribbon to keep adjacent layers of tape from sticking together. Mylar tape is a polyester resin base material and consists essentially of the condensation product of ethylene glycol and terephthalic acid forming polymerized material having repeating units of polyethyleneterephthalate. The invention is in no sense limited to this particular material, this being only one example of a material that possesses the necessary tensile resistance, solvent resistance and lubricity required for the application of the present invention. To remove the "Mylar" ribbon, a power take-off chain 108 which is also driven by the vari-drive motor 30 actuates a takeup spool 110 (FIGURE 7) which is actuated through a slip clutch 112. The takeup spool is thus coordinated with winding of the tape onto the mandrel 35 so that the interleaved "Mylar" ribbon 120 is taken up at the same speed as tape 70 is transferred onto the mandrel 35. The addition of takeup spool 110 is optional equipment and the "Mylar" ribbon can of course be simply stripped away as the tape feeds off of the reel and is spilled onto the floor.

Although the invention has been described and explained in connection with but a single embodiment of the invention, numerous adaptations and revisions of the invention will undoubtedly occur to those skilled in the art. Accordingly, it is intended that such variations and revisions as incorporate the herein disclosed principles, will be included within the scope of the following claims as equivalents of the invention.

What is claimed is:

1. A machine for forming laminations consisting of helically wound continuous length tape comprising two spaced winding arms each having a supporting portion disposed in collinear relation, means provided on each of said winding arms gripping opposite ends of a mandrel forming end supports for the mandrel, said end supports being adapted to rotate in said winding arms, means for rotatably driving said end supports about an axis of the mandrel defined by an imaginary line passing through said end supports and the mandrel, a drive shaft for each of said winding arms defining an axis of rotation for each arm providing end-over-end swinging movement of said mandrel, driving means effecting rotation of said winding arms to produce end-over-end swinging movement of said mandrel, and tape-feeding means for dispensing tape in a continuous length which is transferred onto the mandrel as the mandrel follows its rotational and end-over-end movement.

2. A machine for forming laminations from helically wound continuous lengths of tape material comprising two spaced arcuate winding arms each having one end mounted for rotation about a common axis and ends opposite said mounted ends disposed in collinear spaced relation defining a second axis of rotation by an imaginary line connecting said opposite ends which are separated by a distance proportioned to receive a mandrel therebetween, means for rotatably supporting the mandrel at its opposite ends between said ends disposed in collinear spaced relation to effect rotation of the mandrel on said second axis of rotation, and means for rotating said arms about their common axis to effect end-over-end turning of said mandrel coincidently with rotation thereof, and means for dispensing a continuous length of tape material which is laid over the surface of said mandrel as it undergoes its coincident rotational and end-over-end movement to produce a lamination from the build-up of tape which follows a continuous length path.

3. The machine in accordance with claim 2 including means for adjusting the angularity of said arcuate arms to regulate the angle of the axis of rotation of said mandrel relatively to the axis of rotation of said arms providing end-over-end movement of said mandrel to determine the attitude of said mandrel which establishes the angle of wrap.

4. The machine structure in accordance with claim 3 wherein said means for dispensing tape includes means which develops substantially constant tension on the tape as it is passed over the mandrel.

5. A winding machine for developing laminations consisting of helically wound cycles which are related one to the next in accordance with a determined pattern, said machine comprising a mandrel having a cylindrical section, two spaced winding arms each having a mounting at one end and disposed in relation to each other on a tumble axis of rotation, means at the other end of each winding arm to provide rotatable support for a mandrel by attachment to the opposite ends of the mandrel and located on a line which provides a rotational axis for said mandrel, means for adjusting said other ends of said arms to locate the rotational axis of said mandrel in relation to said tumble axis, and means for effecting both rotational and tumble movement of said mandrel.

6. A winding machine for developing laminations consisting of helically wound cycles which are related one to the next in accordance with a prescribed pattern, said machine comprising a mandrel having a cylindrical section, two spaced winding arms each having a mounting at one end and disposed in relation to each other on a tumble axis of rotation, means at the other end of each winding arm to provide rotatable support for a mandrel by attachment to the opposite ends of the mandrel and located on a line which provides a rotational axis for said mandrel, means for adjusting said other ends of said arms to locate the rotational axis of said arms to locate the rotational axis of said mandrel in relation to said tumble axis, means for effecting both rotational and tumble movement of said mandrel and means for dispensing tape which is laid in tension over the outer surface of said mandrel during rotational and tumbling movement thereof.

7. A winding machine for developing laminations consisting of helically wound cycles which are related one to the next in accordance with a prescribed pattern, said machine comprising a mandrel having a cylindrical section, two spaced winding arms each having a mounting at one end and disposed in relation to each other on a tumble axis of rotation, means at the other end of each winding arm to provide rotatable support for a mandrel by attachment to the opposite ends of the mandrel and located on a line which provides a rotational axis for said mandrel, means for adjusting said other ends of said arms to locate the rotational axis of said arms to locate the rotational axis of said mandrel in relation to said tumble axis, means for effecting both rotational and tumble movement of said mandrel, means for dispensing tape which is laid in tension over the outer surface of said mandrel during rotational and tumbling movement thereof and means for traversing said tape dispensing means back and forth in directions perpendicular to the plane of tumble movement of said mandrel.

References Cited in the file of this patent
UNITED STATES PATENTS

| | | |
|---|---|---|
| 2,705,978 | Caldwell | Apr. 12, 1955 |
| 2,747,649 | Reed | May 29, 1956 |
| 2,788,836 | Trevaskis et al. | Apr. 16, 1957 |
| 2,843,153 | Young | July 15, 1958 |
| 2,901,190 | Wentz | Aug. 25, 1959 |
| 2,967,796 | Raffel | Jan. 10, 1961 |